United States Patent Office 3,073,833
Patented Jan. 15, 1963

3,073,833
NOVEL AMIDE DERIVATIVE AND PROCESS OF PRODUCING SAME
Fred W. Starks, Buffalo, N.Y., assignor to The Samuel Roberts Noble Foundation Incorporated, Ardmore, Okla., a corporation of Oklahoma
No Drawing. Filed Sept. 15, 1960, Ser. No. 56,099
3 Claims. (Cl. 260—293.4)

This invention relates to a novel amide derivative and to a process of producing same.

In carrying out my invention I first produce a novel intermediate piperidine derivative which may then be reacted in a manner to be described to produce the final compound of this invention.

According to my invention I initially produce the compound α-piperidinosuccinonitrile which has the structural formula:

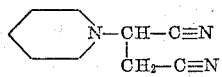

by reacting fumaronitrile with piperidine in the presence of an organic solvent such as benzene, methanol, ethanol, etc.

This reaction may be illustrated by the following equation:

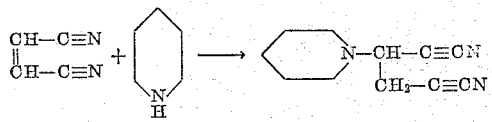

In carrying out the reaction the reactants are preferably employed in stoichiometric quantities and the temperature of the reaction is preferably maintained at about room temperature by means of external cooling, although the temperature may be lower. After the reaction has subsided the reaction medium is stored at room temperature, preferably overnight. The solvent is then removed under vacuum and the crystalline residue recrystallized from an ethanol-water mixture. Extreme care must be exercised during the recrystallization since hydrogen cyanide is liberated when the compound is dissolved in methanol or ethanol.

The α-piperidinosuccinonitrile thus produced is employed as one of the initial reactants in the production of the final compound of this invention. In preparing the final compound α-piperidinosuccinonitrile is reacted with piperidine in the presence of an organic solvent and hydrogen sulfide gas to produce piperidinosuccinodithiodipiperidide which has the structural formula:

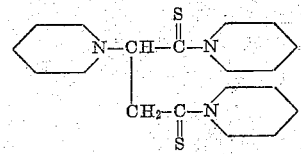

This reaction may be illustrated by the following equation:

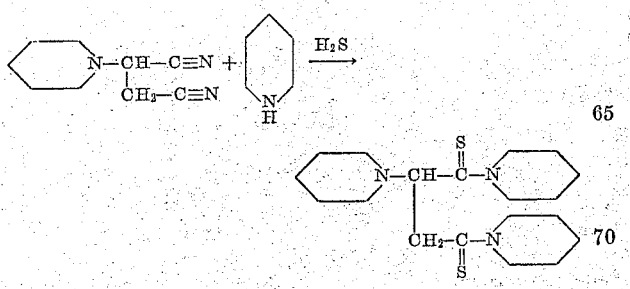

In carrying out the reaction α-piperidinosuccinonitrile and piperidine are added to an organic solvent such as ethanol and hydrogen sulfide gas is then bubbled through the reaction medium for about 1–2 hours while the reaction temperature is maintained at 25° C. or below by means of external cooling. The reaction solution is then stored at room temperature for several hours, about 4–24 hours to allow for completion of the reaction. About 50% of the solvent is then removed under vacuum and the product recovered by crystallization.

The compound of this invention may be employed in the agricultural field for such uses as a bactericide, insecticide, miticide, fungicide, defoliant or for seed sterilization.

The following example is illustrative only of my invention and I intend to be bound only by the spirit and scope of the appended claims.

EXAMPLE I

*Synthesis of Piperidinosuccinodithiodipiperidide*

To a minimum amount of ethanol were added 0.044 moles of α-piperidinosuccinonitrile and 0.088 moles of piperidine. Hydrogen sulfide gas was bubbled through the solution for 120 minutes. During this time the solution was maintained at a temperature of 25° C. or below by external cooling. The solution was then stored at room temperature for 4–24 hours to permit the reaction of the components. At the end of this period approximately 50% of the solvent was removed under vacuum. The reaction product was recovered by adding water in small increments to initiate crystallization, then in large excess. The yellow-orange crystalline material was quickly filtered and air dried. Yield was 4.3 grams. Melting of the product varies from 140° C. to 143° C. depending on rate of heating the sample and purity.

Infra-red spectrum shows that the compounds contain no characteristic infra-red bands of functional groups that were present before the reaction. This pertains particularly to the nitrile groups. At the same time a band characteristic of thioamides is present.

Having thus provided a written description of the present invention and provided specific examples thereof, it should be understood that no undue restrictions or limitations are to be imposed by reason thereof but that the present invention is defined by the appended claims.

I claim:

1. The compound piperidinosuccinodithiodipiperidide.

2. The process of producing piperidinosuccinodithiodipiperidide comprising adding piperidine and α-piperidinosuccinonitrile to ethanol, passing hydrogen sulfide gas through said mixture for up to 2 hours, maintaining the reaction temperature below about 25° C., allowing the reaction medium to stand for about 4–24 hours, then removing about 50% of the ethanol and recovering the desired product by crystallization from the reaction medium.

3. The process of producing piperidinosuccinodithiodipiperidide comprising reacting piperidine with α-piperidinosuccinonitrile in the presence of ethanol and hydrogen sulfide, maintaining the temperature at not more than about 25° C., and recovering the desired product from the reaction medium.

No references cited.

UNITED STATES PATENT OFFICE
CERTIFICATE OF CORRECTION

Patent No. 3,073,833                          January 15, 1963

Fred W. Starks

It is hereby certified that error appears in the above numbered patent requiring correction and that the said Letters Patent should read as corrected below.

Column 1, lines 27 and 31, the equation should appear as shown below instead of as in the patent:

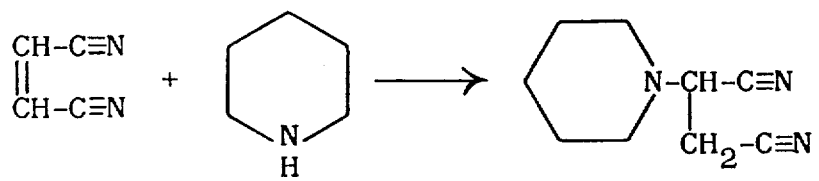

Signed and sealed this 29th day of October 1963.

(SEAL)
Attest:
ERNEST W. SWIDER
Attesting Officer

EDWIN L. REYNOLDS

Acting Commissioner of Patents